Figure 1:
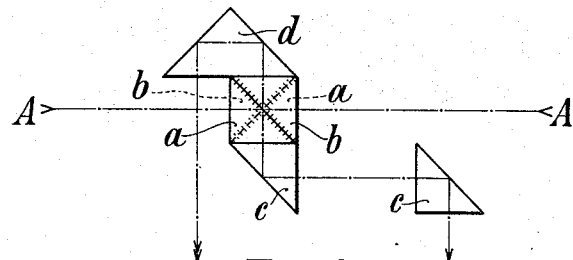

A. KÖNIG.
STEREOSCOPIC TELEMETER.
APPLICATION FILED NOV. 30, 1912.

1,062,166.

Patented May 20, 1913.

Witnesses:
Paul Krüger
Richard Hahn

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

STEREOSCOPIC TELEMETER.

1,062,166.   Specification of Letters Patent.   Patented May 20, 1913.

Application filed November 30, 1912. Serial No. 734,310.

*To all whom it may concern:*

Be it known that I, ALBERT KÖNIG, a citizen of the German Empire, residing at Jena, Germany, have invented a new and useful Stereoscopic Telemeter, of which the following is a specification.

The present invention relates to a stereoscopic telemeter of the type, which has become known through the German patent specification 162471, and is shown in that specification by Figure 6 and described on page 6, lines 93 to 115. To each of the oculars of this telemeter, which, as usual, lie between the objective lenses, a double image is presented, the part-images of which are both erect, belong to opposite ends of the base-line and are contiguous to each other in a line of coincidence parallel to the base-line. The above-mentioned figure is, moreover, illustrative of the more general case, that the lower pair of part-images belongs to a different base-line than the upper one. Each double image is obtained by a special separating prism system (shown in the said figure by crossed reflectors) from a special pair of images, for which purpose two objective lenses are disposed at either end of the base-line. For measuring purposes a deflecting device is provided, which in the case under consideration must permit of altering the relative distance of the lower part-images and that of the upper part-images by equal but opposite amounts. Although such a device is not shown in the above-mentioned figure, it is described in the text page 2, lines 43 to 51, and page 5, lines 3 to 8. When in this well-known telemeter through the actuation of the deflecting device coincidence has been obtained in the two double images for an object at any range (*e. g.* an infinitely great one), which object belongs partly to the lower and partly to the upper part-images, as is well known, in either double image that part of an object likewise divided by the line of coincidence, but finitely distant, which belongs to the lower part-image, lies displaced relatively to the part belonging to the upper part-image in the direction parallel to the line of coincidence. This displacement is, for the above assumed case of the coincidence of infinitely distant objects, the greater, the smaller the distance of the now observed object. Because in either double image the two part-images and, as is necessary for stereoscopic observation, the lower as well as the upper part-images belong to opposite ends of the base-line, in one double image the lower part of this object lies displaced relatively to the upper part in the opposite sense to what is the case in the other double image. The two images of the lower object-part therefore have another relative distance than those of the upper object-part. When observing stereoscopically, this has the well-known effect, that the lower part of the object lies at a seemingly different distance than the upper part, while the relative position, which in either double image the images of the upper and the lower object-part occupy, does not become perceptible. From the just described manner, in which the part-images belong to the ends of the base-line it also follows, that one part of the spatial image is orthostereoscopic and the other pseudostereoscopic. When by actuating the deflecting device the relative distance of the two images of the lower object-part is made equal to that of the two images of the upper one, the apparent distance of the lower object-part also becomes equal to that of the upper one. The actuation of the deflecting device, until this parity in the apparent distance is obtained, constitutes the measuring, when the instrument is used as a stereoscopic telemeter. As by the actuation of the deflecting device the relative distance between the lower and that between the upper part-images is altered by equal but opposite amounts, the relative distance between the two images of the lower object-part is equal to that of the upper one, when coincidence for the object is obtained. The instrument is therefore adapted to be used with either of its oculars as a coincidence telemeter, without requiring any altered adjustment. The new telemeter differs from this well-known one by its two double images being derived from one and the same separating prism system. For to its oculars are presented the two double images of a separating prism system, of which images in uniocular telemeters usually only one is observed, while the other one, which is produced by the so-called lost rays, remains unused, similarly as there is derived from each of the separating prism systems of the above-mentioned stereoscopic telemeter, which is improved by this invention, besides the observed double image another one, that remains unused. In the new telemeter along with the second separating prism system the two objective lenses belonging to it are also omitted, so that it only possesses two objective lenses.

A stereoscopic telemeter, in which the oculars lie between the objective lenses and the images presented to them are similarly constituted and are displaced, while a range is being found, in the same manner as in the well-known telemeter, which is improved by this invention, has become known through Figs. 20 to 23 of the British patent specification 6,082 of 1910. In this telemeter as well, the adaptability of which as a uniocular instrument is explicitly mentioned on page 8, lines 51 to 53, only two objectives are employed, which receive the two ray-pencil-systems entering at the ends of the base-line. For obtaining the two double images from the pair of images formed by the objectives the field-lens of either of the two terrestrial angled oculars consists in this patent of two part-lenses, which form a wedge-edge with one another, and to either ocular is added a second lens of reversion and a second reflecting prism. Further it is known from the patent specification 830,668 (page 2, lines 39 to 48), that in a telemeter having a separating prism one or the other, as may be desired, of the double images obtained through this prism can be presented to the ocular. Finally from the German patent specification 231461 a separating prism telemeter is known, having two oculars, which, arranged at an angle to each other for the purpose of being used alternately, are directed toward the one and the other of the two double images of the separating prism.

If a pair of measuring mark systems or a pair of single marks be disposed in the ocular focal planes, an arrangement known from stereoscopic telemeters, to each of the oculars of which a simple image is presented, and if this be done in such a manner that the spatial scale of ranges comes to lie in the orthostereoscopic part of the field of view or that the spatial single mark lies entirely or partly in this part of the field of view, the instrument may also be used similarly to one of those well-known telemeters, viz., only with the orthostereoscopic part of the field of view. In the case of the spatial scale of ranges the distance of the object, whose range is to be found, may be read off directly on it, at a position of the deflecting device, fixed by the adjustment. In the case of the spatial single mark the measurement is effected by bringing the object, whose range is to be found, by means of the deflecting device into the same apparent distance as the said single mark. With certain objects the application of these methods of measuring has an advantage; it is possible, e. g., to so measure the distance of punctual sources of light, without having need of the well-known devices, by which the image of the point of light is changed into a line.

Figure 2:
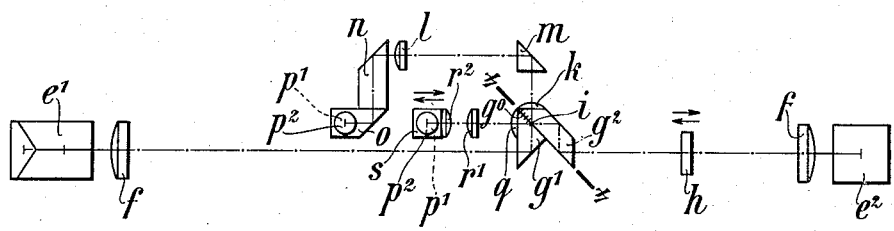
Figure 3:
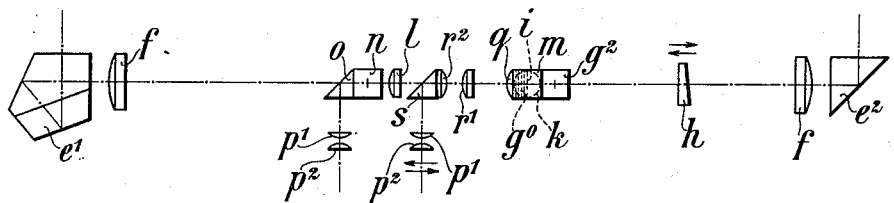
Figure 4:
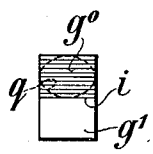
Figure 5:
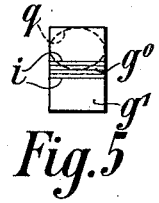

In the annexed drawing: Fig. 1 is a diagrammatic plan view of an ocular prism system constructed according to the present invention. Figs. 2 and 3 are diagrammatic views in elevation and plan respectively of the optical parts of a telemeter constructed according to the invention. Fig. 4 shows the separating layer of this telemeter on an enlarged scale and is a section on line 4—4 of Fig. 2. Fig. 5 shows a separating layer of another type.

In Fig. 1 the separating prism system of the ocular prism system contains two separating layers lying at different heights and crossing one another. Two right-angled reflecting prisms $a$ having each a silvered hypotenusal surface, which is reflecting on both sides, are superposed in such a manner that these surfaces stand perpendicularly the one on the other and at an inclination of 45° to the direction of the base-line A A. For the protection of the separating layers each has cemented to it a right-angled reflecting prism $b$. The mixed ray-pencil-system, which emerges from the front of the prisms $a$ (its axial ray is indicated by a single arrow-head), is transmitted by means of two right-angled reflecting prisms $c$ to the right-hand ocular and furnishes a double image, the lower part-image of which belongs to the right-hand and the upper part-image to the left-hand end of the base-line. The mixed ray-pencil-system, which contains the rays, that would otherwise be lost, and emerges from the back of the prisms $b$ (its axial ray is indicated by a double arrow-head), is transmitted by being twice reflected in a right-angled reflecting prism $d$ to the left-hand ocular and furnishes a double image, the lower part-image of which belongs to the left-hand and the upper part-image to the right-hand end of the base-line.

In the separating prism system, Figs. 2 and 3, a single separating layer reflecting on both sides is disposed. From the ray-pencil-systems entering at the ends of the base-line two objective prisms $e^1$ and $e^2$ two images are produced by means of two objective lenses $f$ and these are transmitted to the separating layer $g^0$ of a separating prism system $g^1$, $g^2$, after the right-hand ray-pencil-system has passed through a displaceable glass wedge $h$, which indicates the deflecting device. The said separating layer occupies, as may be seen in Fig. 4, the upper half of the sectional surface and the axial rays impinge upon its separating edge $i$, which is parallel to the plane of triangulation. One of the two double images produced by the separating prism system $g^1$, $g^2$, one or other of which images can optionally be looked upon as the product of the so-called lost rays, is presented to the left-hand ocular $p^1$, $p^2$ by means of a collective lens $k$ and a lens or reversion $l$, between which a reflecting prism $m$ is disposed, as also by means of the three reflecting surfaces of two prisms $n$ and $o$. The other double image is transmitted to the right-hand ocular $p^1$, $p^2$ by means of a collective lens $q$ and a lens of reversion consisting of two separate members $r^1$, $r^2$, as also by means of a reflecting prism $s$. The lenses $q$, $r^1$ and $r^2$ are so chosen as regards their powers that between $r^1$ and $r^2$ the rays in the ray-pencils follow parallel paths, in order, by displacing the right-hand ocular with the prism $s$ and the lens $r^2$ in a direction parallel to the base-line, to be able to adapt the distance between the oculars to the interocular distance of the observer.

In the example, Figs. 2 and 3, the lower part of the spatial image is orthostereoscopic, the upper part pseudostereoscopic, each part occupying half of the total field of view. When the separating layer $g^o$ is formed, as in Fig. 5, as a band parallel to the plane of triangulation, having two separating edges $i$, the part-images contributing toward the formation of the pseudostereoscopic part of the spatial image are bounded by these two separating edges, and those contributing toward the formation of the orthostereoscopic part lie, divided into two pieces, below and above those contributing toward the formation of the pseudostereoscopic part; hence only in a smaller part of the spatial image the clearness is disturbed by the pseudostereoscopic property of this part. Should it be desired to bring about a division of the field of view, in which the pseudostereoscopic part is surrounded by the orthostereoscopic one, this might be attained, by letting the band-shaped separating layer according to Fig. 5 stretch only across the middle part of the prism.

I claim:

In a stereoscopic telemeter, in which the base-line is contained within the instrument, two objective reflecting systems, one at either end of the said base-line, two objective lenses, two oculars and a separating prism system lying between the said objective lenses, the said separating prism system adapted to present to either of the said oculars a double image, the part-images of which are both erect, belong to opposite ends of the said base-line and are contiguous to each other in a line of coincidence parallel to the said base-line, and measuring means consisting of a deflecting device adapted to alter the relative distance between the lower part-images and that between the upper part-images by equal but opposite amounts.

ALBERT KÖNIG.

Witnesses:
PAUL KRÜGER,
RICHARD HAHN.